United States Patent
Zhang

(10) Patent No.: US 9,883,175 B2
(45) Date of Patent: Jan. 30, 2018

(54) GRATING STRUCTURE, DISPLAY DEVICE AND DISPLAY MODE SWITCHING METHOD

(71) Applicants: BOE TECHNOLOGY GROUP CO., LTD., Beijing (CN); BEIJING BOE DISPLAY TECHNOLOGY CO., LTD., Beijing (CN)

(72) Inventor: Chunbing Zhang, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 287 days.

(21) Appl. No.: 14/437,143

(22) PCT Filed: Sep. 9, 2014

(86) PCT No.: PCT/CN2014/086130
§ 371 (c)(1),
(2) Date: Apr. 20, 2015

(87) PCT Pub. No.: WO2015/154372
PCT Pub. Date: Oct. 15, 2015

(65) Prior Publication Data
US 2016/0301921 A1    Oct. 13, 2016

(30) Foreign Application Priority Data
Apr. 11, 2014   (CN) .......................... 2014 1 0146281

(51) Int. Cl.
*H04N 7/18*     (2006.01)
*H04N 13/04*    (2006.01)
(Continued)

(52) U.S. Cl.
CPC ....... *H04N 13/0454* (2013.01); *G02B 26/004* (2013.01); *G02B 26/026* (2013.01);
(Continued)

(58) Field of Classification Search
CPC ........... G01J 1/04; H04N 5/225; H04N 5/235; G09G 3/36; G09G 3/3413; G09G 2310/061; G09G 232/0252
(Continued)

(56) References Cited

U.S. PATENT DOCUMENTS 6,323,989 B1 *  11/2001  Jacobson ................... B41J 2/01
                                                     345/107
8,902,144 B2 *  12/2014  Umezaki .............. G09G 3/3413
                                                     345/100

(Continued)

FOREIGN PATENT DOCUMENTS

CN    101542375 A    9/2009
CN    101713896 A    5/2010
(Continued)

OTHER PUBLICATIONS

Written Opinion of the International Searching Authority for international application No. PCT/CN2014/086130.
(Continued)

*Primary Examiner* — Andy Rao
(74) *Attorney, Agent, or Firm* — Harness, Dickey & Pierce, P.L.C.

(57) ABSTRACT

The present disclosure provides a grating structure, a display device and a display mode switching method. The grating structure includes a light-entering surface, a light-exiting surface, and a plurality of grating units arranged continuously between the light-entering surface and the light-exiting surface. Each grating unit includes: an accommodation chamber; a non-transparent electronic ink received in
(Continued)

the accommodation chamber and having a predetermined electric polarity; and a controlling module arranged at a periphery of the accommodation chamber and configured to control a region of the electronic ink in the accommodation chamber. When an electric signal is applied by the controlling module, the electronic ink moves to a corresponding region in the accommodation chamber, and after the electric signal is cancelled by the controlling module, the electronic ink is maintained at the current region. The grating structure supports the switching between 2D and 3D display modes and reduces the power consumption.

15 Claims, 7 Drawing Sheets

(51) Int. Cl.
*G02B 26/00* (2006.01)
*G02B 26/02* (2006.01)
*G02B 27/22* (2006.01)
*G02F 1/137* (2006.01)
*G02F 1/167* (2006.01)
*H04N 13/02* (2006.01)

(52) U.S. Cl.
CPC ......... *G02B 27/2214* (2013.01); *G02F 1/137* (2013.01); *G02F 1/167* (2013.01); *H04N 13/0497* (2013.01); *G02F 2001/1676* (2013.01); *G02F 2001/1678* (2013.01); *H04N 13/0225* (2013.01)

(58) Field of Classification Search
USPC .................................................... 348/51–60
See application file for complete search history.

(56) References Cited

U.S. PATENT DOCUMENTS

| | | | | |
|---|---|---|---|---|
| 9,086,318 | B1 * | 7/2015 | Baldwin | ................. G01J 1/04 |
| 2007/0236777 | A1 | 10/2007 | Ikeda | |
| 2010/0276707 | A1 | 11/2010 | Kim et al. | |

FOREIGN PATENT DOCUMENTS

| | | |
|---|---|---|
| CN | 102540616 A | 7/2012 |
| CN | 102667604 A | 9/2012 |
| CN | 103246123 A | 8/2013 |
| CN | 103389582 A | 11/2013 |
| CN | 103592759 A | 2/2014 |
| CN | 103941391 A | 7/2014 |
| CN | 203773156 U | 8/2014 |
| JP | 2003107533 A | 4/2003 |
| JP | 2003161964 A | 6/2003 |
| JP | 2004325632 A | 11/2004 |
| JP | 2006047614 A | 2/2006 |
| KR | 20030079499 A | 10/2003 |
| TW | 200835995 A | 9/2008 |
| WO | WO-0043835 A1 | 7/2000 |

OTHER PUBLICATIONS

Recent Development of Electronic Paper Based on Electrophoresis. Xiang-kai Fu, Wei Luo, Research progress of electronic ink technologies, Journal of Functional Materials, 2005.
L. Li, S. Zhang, J. Yang, J. Zou, Technology and Prospects of Electronic-Paper Display, Chinese Journal of Electron Devices, vol. 26, No. 2, Jun. 2003.
Second Office Action regarding Chinese application No. 201410146281.1, dated Mar. 30, 2016. Translation provided by Dragon Intellectual Property Law Firm.
Third Office Action regarding Chinese application No. 201410146281.1, dated Aug. 19, 2016. Translation provided by Dragon Intellectual Property Law Firm.

* cited by examiner

GRATING STRUCTURE, DISPLAY DEVICE AND DISPLAY MODE SWITCHING METHOD

CROSS-REFERENCE TO RELATED APPLICATIONS

The present application is the U.S. national phase of PCT Application No. PCT/CN2014/086130 filed on Sep. 9, 2014, which claims a priority of the Chinese patent application No. 201410146281.1 filed on Apr. 11, 2014, the disclosures of which are incorporated herein by reference in their entirety.

TECHNICAL FIELD

The present disclosure relates to the field of display control technology, in particular to a grating structure, a display device using the grating structure, and a display mode switching method.

BACKGROUND

Currently, three-dimensional (3D) display has become a main stream in the display field. Among traditional autostereoscopic display technologies, usually a liquid crystal grating is used to switch a display device between a two-dimensional (2D) display mode and a 3D display mode. During the display mode switching, it is required in the existing technologies to continuously apply a specific electric signal so as to change the display mode. When this electric signal disappears, the corresponding display mode cannot be maintained any more. In other words, in order to maintain the display mode, it is usually required in the related art to continuously apply the specific electric signal, which results in large power consumption for the display device.

Obviously, the traditional display mode switching technology cannot meet the environment-friendly requirements due to its large power consumption, so there is an urgent need to find a new display device so as to reduce its power consumption.

SUMMARY

A technical problem to be solved by the present disclosure is to provide a grating structure, a display device using the grating structure and a display mode switching method, to reduce the power consumption of the display device capable of being switched between a 2D display mode and a 3D display mode.

In order to solve the above technical problem, the present disclosure provides in one embodiment a grating structure, including a light-entering surface, a light-exiting surface, and a plurality of grating units arranged continuously between the light-entering surface and the light-exiting surface.

Each grating unit includes:
an accommodation chamber;
a non-transparent electronic ink received in the accommodation chamber and having a predetermined electric polarity; and
a controlling module arranged at a periphery of the accommodation chamber and configured to control a region of the electronic ink in the accommodation chamber,
wherein when an electric signal is applied by the controlling module, the electronic ink moves to a corresponding region in the accommodation chamber, and after the electric signal is cancelled by the controlling module, the electronic ink is maintained at the current region.

Alternatively, the electronic ink is of a spherical structure which exhibits as a whole a first electric polarity or a second electric polarity. The electronic ink includes a first hemispherical body which is non-transparent and exhibits the first electric polarity, and a second hemispherical body which is reflective and exhibits the second electric polarity opposite to the first electric polarity.

Alternatively, when a first electric signal is applied by the controlling module and the electronic ink moves to a first region in the accommodation chamber, a light-transmitting channel is formed in the accommodation chamber from the light-entering surface to the light-exiting surface. When a second electric signal is applied by the controlling module and the electronic ink moves to a second region in the accommodation chamber, the electronic ink forms a blocking layer for blocking a light beam from the light-entering surface from passing through the light-exiting surface.

Alternatively, when the electronic ink forms the blocking layer, the first hemispherical body of the electronic ink faces the light-exiting surface, and the second hemispherical body of the electronic ink faces the light-entering surface.

Alternatively, the controlling module includes:
at least one first electrode structure located at a side wall of the accommodation chamber;
a second electrode structure located at a top wall or a bottom wall of the accommodation chamber; and
an energization controlling unit configured to apply an electric signal to the first electrode structure or the second electrode structure, so as to generate an electric field for the electronic ink, thereby to move the electronic ink to the corresponding region in the accommodation chamber.

Alternatively, when the first electric signal is applied by the energization controlling unit to the first electrode structure and the electronic ink moves to the first region in the accommodation chamber, the light-transmitting channel is formed in the accommodation chamber from the light-entering surface to the light-exiting surface. When the second electric signal is applied by the energization controlling unit to the second electrode structure and the electronic ink moves to the second region in the accommodation chamber, the electronic ink forms the blocking layer for blocking the light beam from the light-entering surface from passing through the light-exiting surface.

Alternatively, the second electric signal includes an electric signal applied to the second electrode structure at the light-entering surface and exhibiting the first electric polarity, and/or an electric signal applied to the second electrode structure at the light-exiting surface and exhibiting the second electric polarity.

Alternatively, when a 2D display mode is switched to a 3D display mode, in a first grating unit and a second grating unit adjacent to each other, the first electric signal is applied by the energization controlling unit of the first grating unit to the first electrode structure of the first grating unit, and the second electric signal is applied by the energization controlling unit of the second grating unit to the second electrode structure of the second grating unit. When the 3D display mode is switched to the 2D display mode, the first electric signal is applied by the energization controlling unit of each grating unit to the first electrode structure of the grating unit.

Alternatively, the second electrode structure is merely arranged at the top or bottom wall of the accommodation chamber, and the second electric signal is of an electric polarity opposite to the electronic ink.

Alternatively, when the second electrode structure includes two electrodes arranged at the top wall and the bottom wall of the accommodation chamber, respectively, the second electric signal includes two electric sub-signals applied to the two electrodes and having opposite electric polarities.

In another aspect, the present disclosure provides in one embodiment a display device including a display panel and the abovementioned grating structure arranged on the display panel.

Alternatively, the display device further includes a backlight module, and the grating structure is arranged between the display panel and the backlight module.

In yet another aspect, the present disclosure provides in one embodiment a display mode switching method for the above-mentioned display device, including steps of:

when a first display mode is switched to a second display mode, in a first grating unit and a second grating unit adjacent to each other in a grating structure of the display device, applying a first electric signal to a first electrode structure of the first grating unit and applying a second electric signal to a second electrode structure of the second grating unit, cancelling the first electric signal when an electronic ink in the first grating unit moves to a first region of the first grating unit to form a light-transmitting channel from a light-entering surface to a light-exiting surface of the grating structure, and cancelling the second electric signal when the electronic ink in the second grating unit moves to a second region of the second grating unit so as to form a blocking layer for blocking a light beam from the light-entering surface from passing through the light-exiting surface; and when the second display mode is switched to the first display mode, applying the first electric signal to a first electrode structure of the second grating unit, cancelling the first electric signal applied to the first electrode structure of the second grating unit when the electronic ink in the second grating unit moves to a first region of the second grating unit so as to form a light-transmitting channel in the second grating unit from the light-entering surface to the light-exiting surface.

Alternatively, when the second display mode is switched to the first display mode, the method further includes: applying the first electric signal to the first electrode structure of the first grating unit, and cancelling the first electric signal applied to the first electrode structure of the first grating unit when the electronic ink in the first grating unit moves to the first region of the first grating unit to form the light-transmitting channel from the light-entering surface to the light-exiting surface of the grating structure.

Alternatively, the first display mode is a 2D display mode, and the second display mode is a 3D display mode.

As compared with a traditional display device capable of being switched between the 2D display mode and the 3D display mode, the embodiments of the present disclosure have the following advantageous effects.

According to the embodiments of the present disclosure, it is merely required to apply a specific electric signal during the display mode switching, and after the display mode switching is completed, the electric signal may be cancelled, so it is able to reduce the power consumption for the display device. In addition, the electronic ink having a reflective hemispherical body is particularly used in the embodiments of the present disclosure, and an appropriate electric signal is applied to the electrode so as to enable the reflective hemispherical body of the electronic ink to face the light-entering surface, so it is able to reflect an optical signal from a backlight source at the light-entering surface, thereby to improve the light utilization rate of the backlight source. Moreover, in accordance with the practical need, it is able to control the electronic ink by means of a single-electrode structure or a double-electrode structure.

DETAILED DESCRIPTION

In order to make the objects, the technical solutions and the advantages of the present disclosure more apparent, the present disclosure will be described hereinafter in conjunction with the drawings and embodiments.

As mentioned above, when an existing display device capable of being switched between a 2D display mode and a 3D display mode is in a certain display mode, it is required to continuously apply a specific electric signal to the display device so as to maintain a current display state. As a result, the power consumption is relatively large, and the display device cannot meet the environment-friendly requirement.

Figure 1:
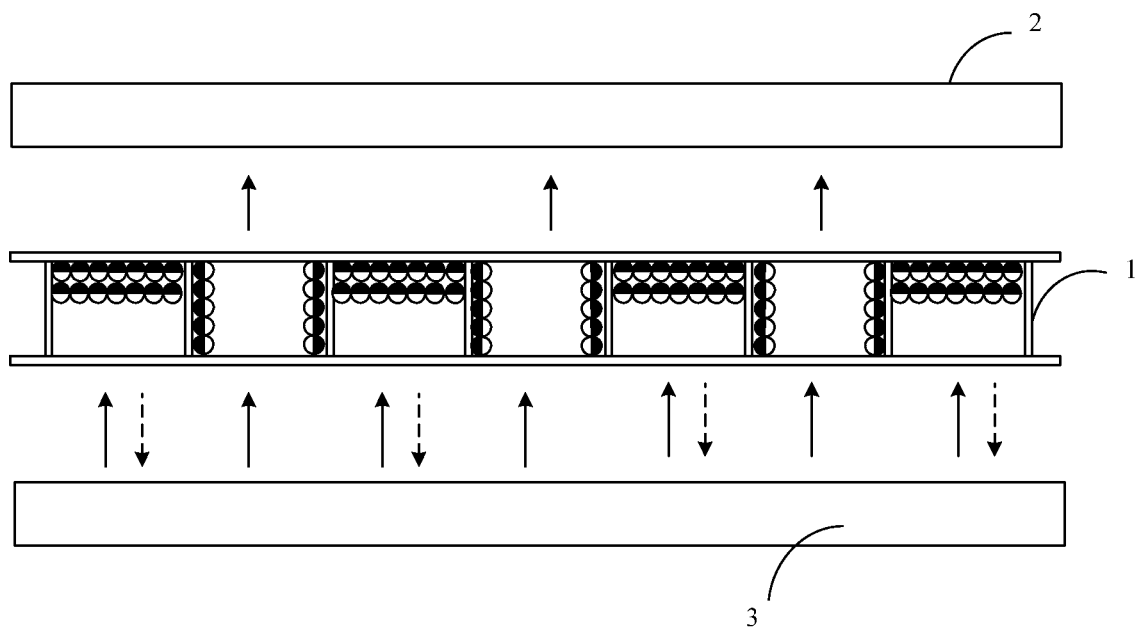
FIG. 1 is a schematic view showing a display device according to one embodiment of the present disclosure.

In order to overcome the above drawbacks in the related art, the present disclosure provides in one embodiment a display device which, as shown in FIG. 1, includes a display panel 2 and a grating structure 1 arranged on the display panel 2. In addition, a backlight module 3 may be arranged below the grating structure 1 so as to serve as a backlight source. In the embodiments of the present disclosure, the grating structure 1 arranged between the display panel 2 and the backlight module 3 may support the display device to be switched between the 2D display mode and the 3D display mode. As compared with the existing grating structure, it is able for the grating structure in the embodiments of the present disclosure to remarkably reduce the power consumption of the display device.

The grating structure 1 in the embodiments of the present disclosure will be described hereinafter.

The grating structure in the embodiments of the present disclosure can support the switching between the 2D display mode and the 3D display mode, and it is merely required to apply a specific electric signal at the moment of switching the display mode. After the display mode switching is completed, it is unnecessary to continuously apply the electric signal so as to maintain a current display state, so it is able to minimize the power consumption of the display device.

Figure 2:
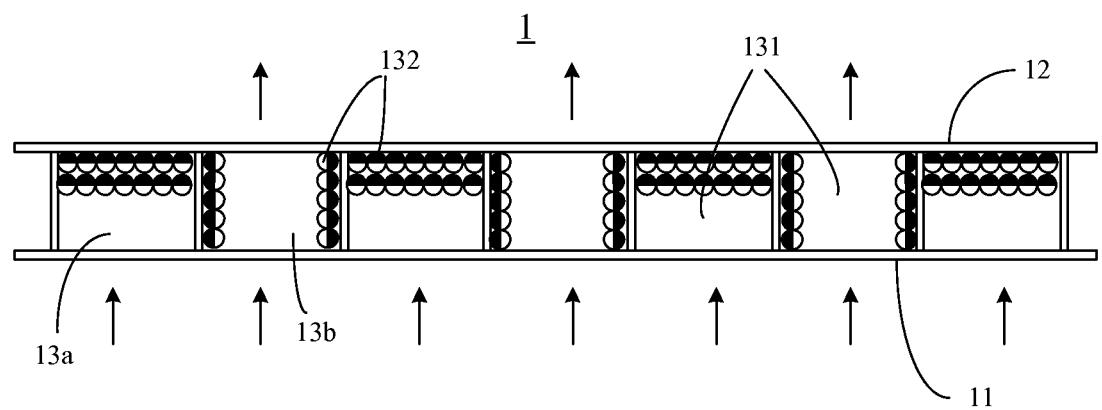
FIG. 2 is a schematic view showing a grating structure in a 3D display mode according to one embodiment of the present disclosure.
Figure 3:
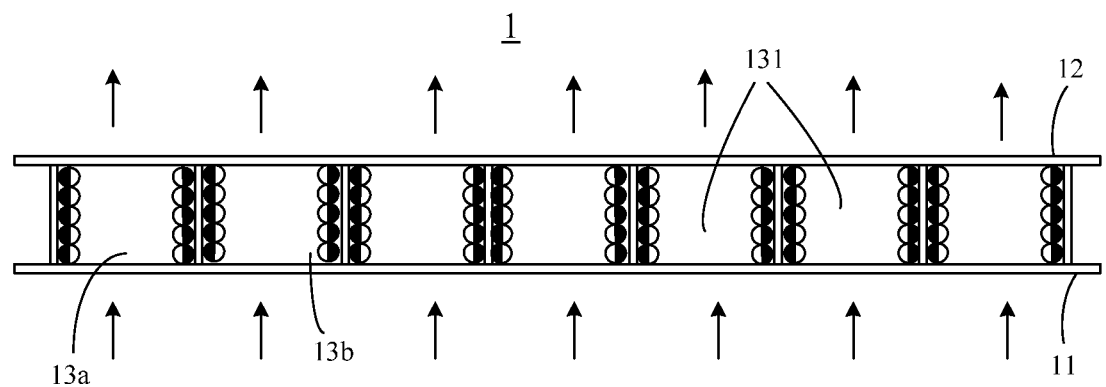
FIG. 3 is a schematic view showing the grating structure in a 2D display mode according to one embodiment of the present disclosure.
Figure 4:
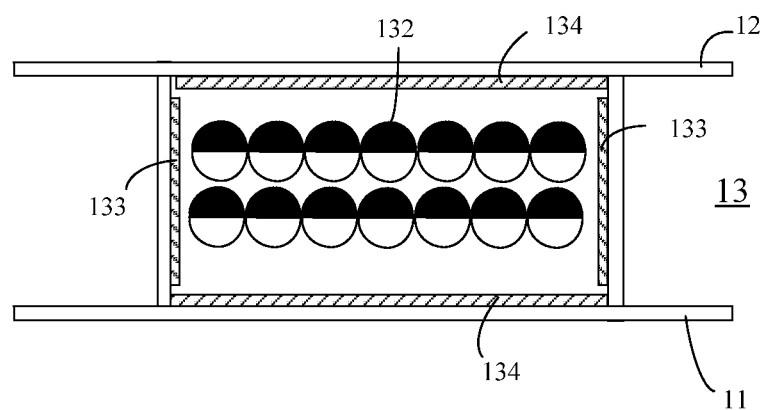
FIG. 4 is a schematic view showing a grating unit of the grating structure according to one embodiment of the present disclosure.

Referring to FIGS. 2-4, the present disclosure provides in one embodiment the grating structure, which includes a light-entering surface 11 and a light-exiting surface 12 arranged opposite to each other, and a plurality of grating units 13 arranged continuously between the light-entering surface 11 and the light-exiting surface 12.

Each grating unit 13 includes:

an accommodation chamber 131;

a non-transparent electronic ink 132 received in the accommodation chamber 131 and having a predetermined electric polarity; and a controlling module (not shown) arranged at a periphery of the accommodation chamber 131 and configured to control a region of the electronic ink 132 in the accommodation chamber 131, wherein when an electric signal is applied by the controlling module, the electronic ink 132 moves to a corresponding region in the accommodation chamber 131, and after the electric signal is cancelled by the controlling module, the electronic ink 132 is maintained at the current region.

As can be seen from the above, when it is required to switch the display mode, the electric signal is applied by the controlling module so as to generate an electric field, and the electronic ink 132 moves to a corresponding region in the accommodation chamber 131 under the effect of the electric field, so as to enable the grating structure to form a structure corresponding to a target display mode. When the applied electric signal is cancelled by the controlling module, the electronic ink 132 is maintained at the current region so as to maintain a current display mode.

In the embodiments of the present disclosure, the electronic ink 132 may be made of a polymer and, as a whole, exhibits a positive or negative polarity. It includes a non-transparent portion, e.g., it may be non-transparent as a whole, or partially non-transparent. The electronic ink 132 may be of a regular or irregular shape. In one example, the electronic ink may be of a spherical structure which exhibits as a whole a first electric polarity or a second electric polarity. It includes a first hemispherical body which is non-transparent and exhibits the first electric polarity, and a second hemispherical body which is reflective and exhibits the second electric polarity opposite to the first electric polarity. The electric polarity of the first hemispherical body is opposite to, and of a size different from, the second hemispherical body, so the electronic ink exhibits as a whole the electric polarity of the hemispherical body having the high electric polarity. For example, the electronic ink may be a half-black and half-white electronic ink consisting of a black hemispherical body and a white hemispherical body, and the black and white hemispherical bodies exhibit different electric polarities. At this time, the electronic ink, as a whole, exhibits the electric polarity of the black or white hemispherical body.

The electronic ink 132 may be manufactured by various known techniques. For ease of understanding, the manufacture of the electronic ink will be described briefly later.

In the embodiments of the present disclosure, when a first electric signal is applied by the controlling module and the electronic ink moves to a first region in the accommodation chamber 131, a light-transmitting channel is formed in the accommodation chamber 131 from the light-entering surface 11 to the light-exiting surface 12. When a second electric signal is applied by the controlling module and the electronic ink moves to a second region in the accommodation chamber 131, the electronic ink forms a blocking layer for blocking a light beam from the light-entering surface 11 from passing through the light-exiting surface 12. When the electric signal is cancelled, the electronic signal is maintained at the current region so as to maintain the currently-formed light-transmitting channel or blocking layer.

In the embodiments of the present disclosure, when the electronic ink forms the blocking layer, the corresponding electric signal may be applied so as to enable the first hemispherical body of the electronic ink to face the light-exiting surface 12 and enable the second hemispherical body to face the light-entering surface 11. In this way, it is able not only to block, by means of the non-transparent first hemispherical body, the light beam from the light-entering surface 11 from passing through the electronic ink and reaching the light-exiting surface 12, but also to reflect, by means of the reflective second hemispherical body, the light beam from the light-entering surface 11 back to the light-entering surface 11. Usually, the light beam is provided by a backlight source at the light-entering surface 11, and when the light beam is reflected by the second hemispherical body, it is able to reduce the light beams required to be blocked by the blocking layer. As a result, it is able to improve the light-blocking effect of the blocking layer, and to remarkably improve the light utilization rate of the backlight source. The modes for applying the electric signal will be described later.

Further, referring to FIG. 4, the control module may include:

at least one first electrode structure 133 (as shown by the hatched portion at a side wall of the accommodation chamber in FIG. 4) located at a side wall of the accommodation chamber;

a second electrode structure 134 (as shown by the hatched portions at a top wall and a bottom wall of the accommodation chamber) located at a top wall and/or a bottom wall of the accommodation chamber 131; and an energization controlling unit (not shown) configured to generate an electric field for the electronic ink 132 by the first electrode structure 133 and/or the second electrode structure 134, so as to move the electronic ink 132 to the corresponding region in the accommodation chamber 131.

In the embodiments of the present disclosure, when the first electric signal is applied by the energization controlling unit to the first electrode structure 133 and the electronic ink moves to the first region in the accommodation chamber 131, the light-transmitting channel is formed in the accommodation chamber 131 from the light-entering surface 11 to the light-exiting surface 12.

When the second electric signal is applied by the energization controlling unit to the second electrode structure 134 and the electronic ink moves to the second region in the accommodation chamber 131, the electronic ink forms the blocking layer for blocking the light beam from the light-entering surface 11 from passing through the light-exiting surface 12.

Here, the first region is a region adjacent to the side wall of the accommodation chamber 131, e.g., a region with a distance from the side wall of the accommodation chamber 131 smaller than a first predetermined value, and the second region is a region adjacent to the top or bottom wall of the accommodation chamber 131, e.g., a region with a distance from the top or bottom wall of the accommodation chamber 131 smaller than a second predetermined value. To be specific, the first and second predetermined values may be set in accordance with indices of the grating in the 3D display mode.

In the embodiments of the present disclosure, in accordance with the desired display mode, an appropriate electric signal is applied by the controlling module of each grating unit 13 so as to move the electronic ink 132 to the corresponding region, thereby to enable the grating structure to form a structure corresponding to the display mode.

In one embodiment, when it is required to switch the 2D display mode to the 3D display mode, the controlling modules of the adjacent grating units 13 control the adjacent grating units 13 to be in different states, i.e., when the light beam is allowed to transmit through one grating unit 13, the light beam is not allowed to transmit through another adjacent grating unit 13, so as to form the 3D grating structure.

As shown in FIG. 2, when the first electric signal is applied by the controlling module of a grating unit 13b and the electronic ink in its accommodation chamber 131 moves to the first region (adjacent to the side wall of the accommodation chamber) in the accommodation chamber 131, the light-transmitting channel is formed in the accommodation chamber 131 from the light-entering surface 11 to the light-exiting surface 12. When the second electric signal is applied by the controlling module a grating unit 13a adjacent to the grating unit 13b and the electronic ink in its accommodation chamber 13 moves to the second region (adjacent to the light-exiting surface 12) in the accommodation chamber 131, the electronic ink forms the blocking layer for blocking the light beam from the light-entering surface 11 from passing through the light-exiting surface 12. The similar electric signals are applied by the controlling modules of the adjacent grating units 13, so that the grating units 13 form the structure corresponding to the 3D display module.

In the embodiments of the present disclosure, a reflective layer may be applied onto a surface of the electronic ink 132, so as to reflect the light beam from the light-entering surface 11 back to the light-entering surface 11 when the blocking layer has been formed, thereby to improve the light utilization rate of the backlight source.

After the display mode is switched to the 3D display mode, the electric signal applied by the controlling module may be cancelled. At this time, the electronic ink 132 is maintained in the current region, and it is able to maintain the current 3D display mode without any need to apply the electric signal continuously. As a result, it is able to remarkably reduce the power consumption for maintaining the display mode, thereby to meet the environment-friendly requirement.

In another embodiment, when it is required to switch the 3D display mode to the 2D display mode, the first electric signal is applied by the control modules of the grating units 13, so as to allow the light beam to pass through the grating units 13, and the original 3D grating structure disappears, as shown in FIG. 3. After the display mode switching is completed, the electric signal applied by the controlling modules is cancelled. At this time, the electronic ink 132 is maintained in the current region, and it is able to maintain the current 2D display mode without any need to apply the electric signal continuously. As a result, it is able to reduce the power consumption for maintaining the display mode.

Alternatively, in the embodiments of the present disclosure, the electronic ink 132 is of a spherical structure which exhibits as a whole the first electric polarity or the second electric polarity. The electronic ink includes the first hemispherical body which is non-transparent and exhibits the first electric polarity, and the second hemispherical body which is reflective and exhibits the second electric polarity opposite to the first electric polarity. By means of the reflective feature of the second hemispherical body, when the second electric signal is applied so as to form the blocking layer, an electric signal exhibiting the first electric polarity may be applied to the second electrode structure at the light-entering surface 11, and an electric signal exhibiting the second electric polarity may be applied to the second electrode structure at the light-exiting surface 12. In other words, the electric signal applied to the electrode at the light-entering surface 11 is of the electric polarity opposite to the second hemispherical body, while the electric signal applied to the electrode at the light-exiting surface 12 is of the electric polarity opposite to the first hemispherical body. In this way, the second hemispherical body of the electronic ink 132 faces the light-entering surface 11 and the first hemispherical body faces the light-exiting surface 12. As a result, when the blocking layer is formed, it is able to further reflect the light beam from the backlight source at the light-entering surface, thereby to improve the light utilization rate of the backlight source.

In the embodiments of the present disclosure, a single-electrode or a double-electrode control mode may be used to enable the second hemispherical body of the electronic ink 132 to face the light-entering surface 11 and enable the first hemispherical body to face the light-exiting surface 12. For the single-electrode control mode, the electric signal exhibiting the first electric polarity may be merely applied to the second electrode structure at the light-entering surface 11, or the electric signal exhibiting the second electric polarity may be merely applied to the second electrode structure at the light-exiting surface 12. For the double-electrode control mode, the electric signal exhibiting the first electric polarity is applied to the second electrode structure at the light-entering surface 11 and meanwhile the electric signal exhibiting the second electric polarity is applied to the second electrode structure at to the light-exiting surface 12.

The arrangement mode of the electrode structures that may be adopted in the embodiments of the present disclosure, as well as the directions of the applied electric signals/electric fields when it is required to switch the display mode, will be described hereinafter in conjunction with the drawings.

Case 1) where the electronic ink 132 is non-transparent as a whole, the first electrode structure 133 and the second electrode structure 134 are each of a single-electrode structure, and the electric signal applied to the electrode structures 133 and 134 is of an electric polarity opposite to the electronic ink 132.

Figure 5:
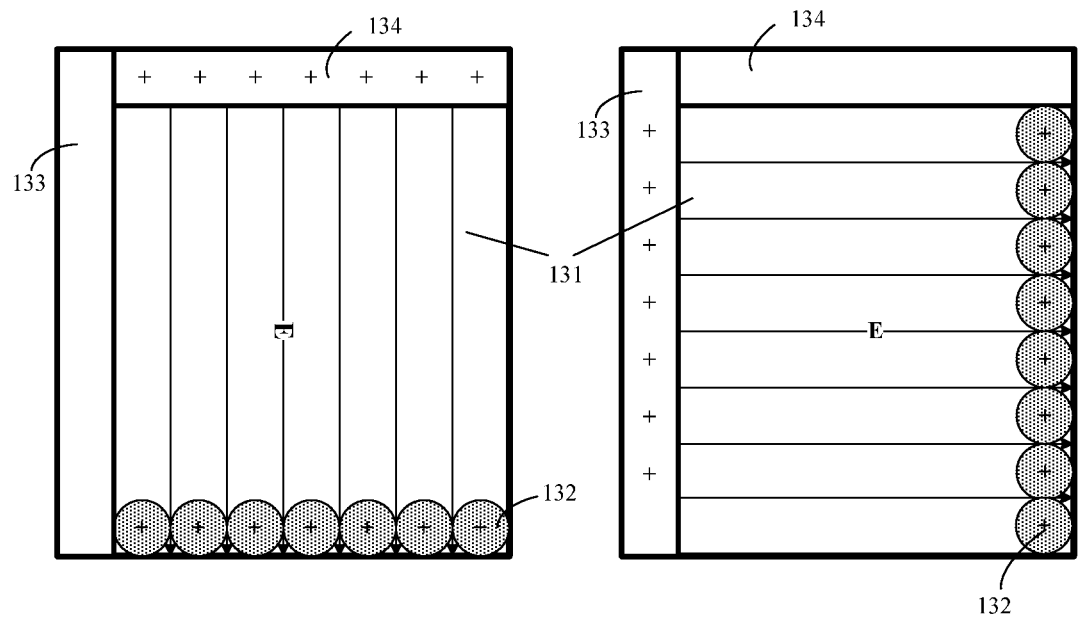
FIGS. 5-13 are schematic views showing electric fields between an electrode structure and an electronic ink according to one embodiment of the present disclosure.

In FIG. 5, the electronic ink 132 is non-transparent and electropositive as a whole. At this time, the first electrode structure 133 and the second electrode structure 134 in the grating unit are each of a single-electrode structure, and the second electrode structure 134 is arranged at the top wall of the accommodation chamber. When it is required to form the blocking layer in the accommodation chamber 131, the electronic ink 131 moves to the bottom wall of the accommodation chamber under the effect of an electric field E after a positive voltage is applied to the second electrode structure 131 at the top wall of the accommodation chamber, so as to form the block layer for blocking the light beam from the light-entering surface. When it is required to form the light-transmitting channel in the accommodation chamber 131, the positive voltage may be applied to the first electrode structure 133, and at this time, the electronic ink 132 moves to an opposite side wall of the accommodation chamber so as to allow the light beam from the light-entering surface to pass therethrough.

Figure 6:
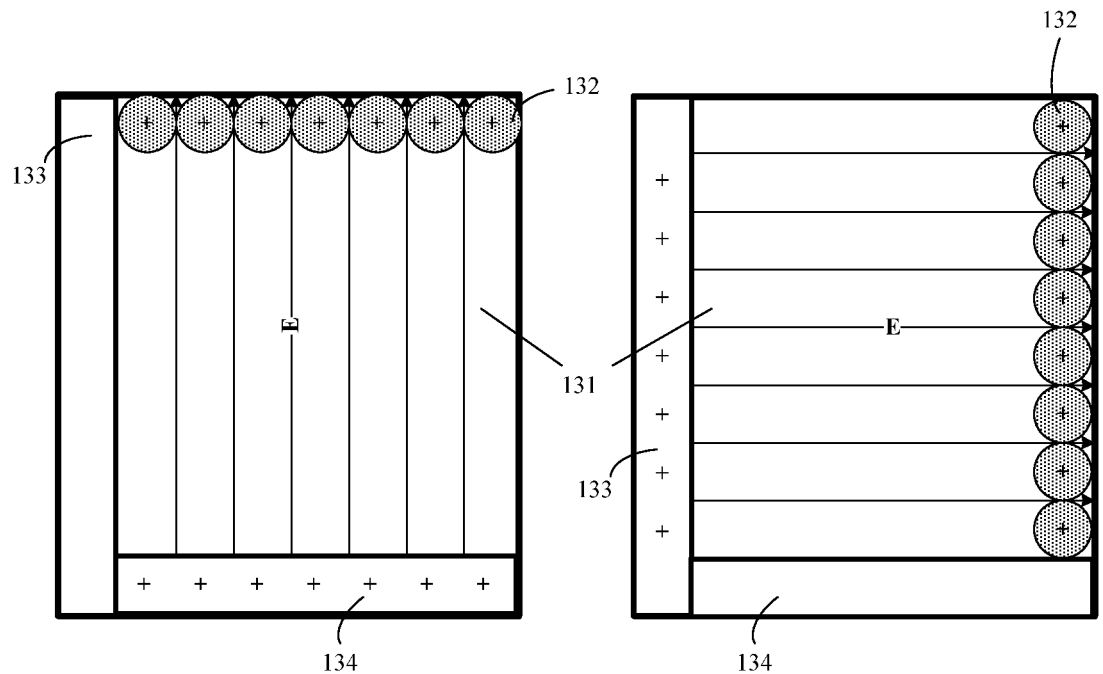

FIG. 6 shows the situation similar to FIG. 5, with the only difference that the second electrode structure 134 is arranged at the bottom wall of the accommodation chamber. After the positive voltage is applied to the second electrode structure 134, the electronic ink 132 moves to the top wall of the accommodation chamber, so as to form the blocking layer for blocking the light beam from the light-entering surface.

Case 2) where the electronic ink 132 as a whole is non-transparent, the first electrode structure 133 and the second electrode 134 are each of a single-electrode structure, and the electric signal applied to the electrode structures 133 and 134 is of the electric polarity opposite to the electronic ink 132.

Figure 7:
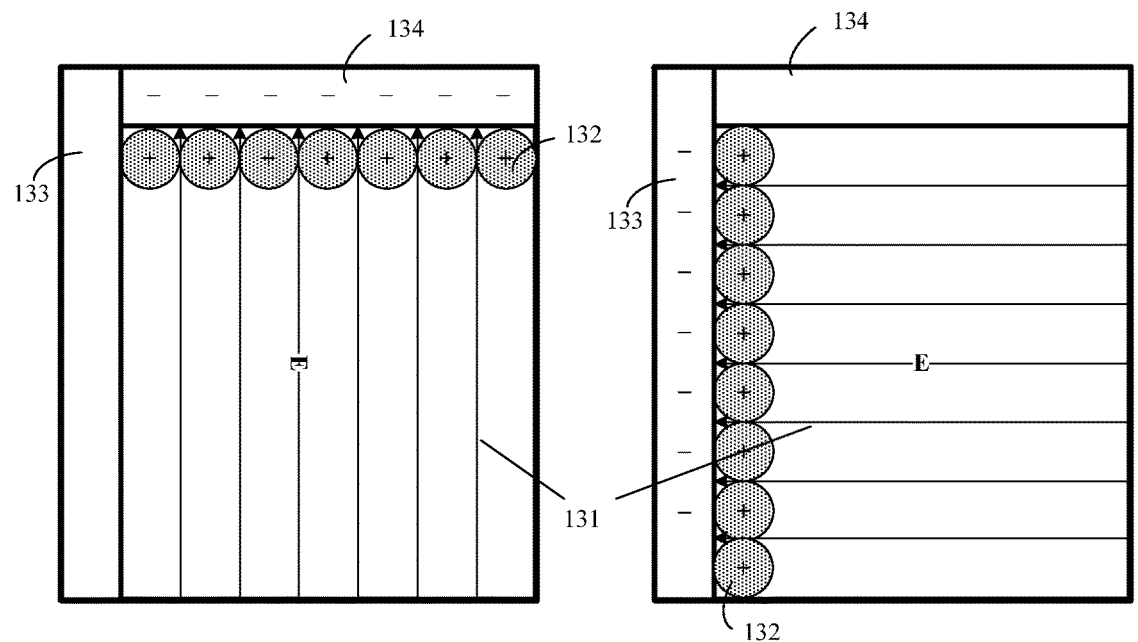

In FIG. 7, the electronic ink 132 is non-transparent and electropositive as a whole. At this time, the first electrode structure 133 and the second electrode structure 134 in the grating unit are each of a single-electrode structure, and the second electrode structure 134 is arranged at the top wall of the accommodation chamber. When it is required to form the blocking layer in the accommodation chamber 131, the electronic ink 131 moves to the top wall of the accommodation chamber under the effect of the electric field E after a negative voltage is applied to the second electrode structure 131 at the top wall of the accommodation chamber, so as to form the block layer for blocking the light beam from the light-entering surface. When it is required to form the light-transmitting channel in the accommodation chamber 131, the negative voltage may be applied to the first electrode structure 133, and at this time, the electronic ink 132 moves to the side wall adjacent to the first electrode structure 133 so as to allow the light beam from the light-entering surface to pass therethrough.

Figure 8:
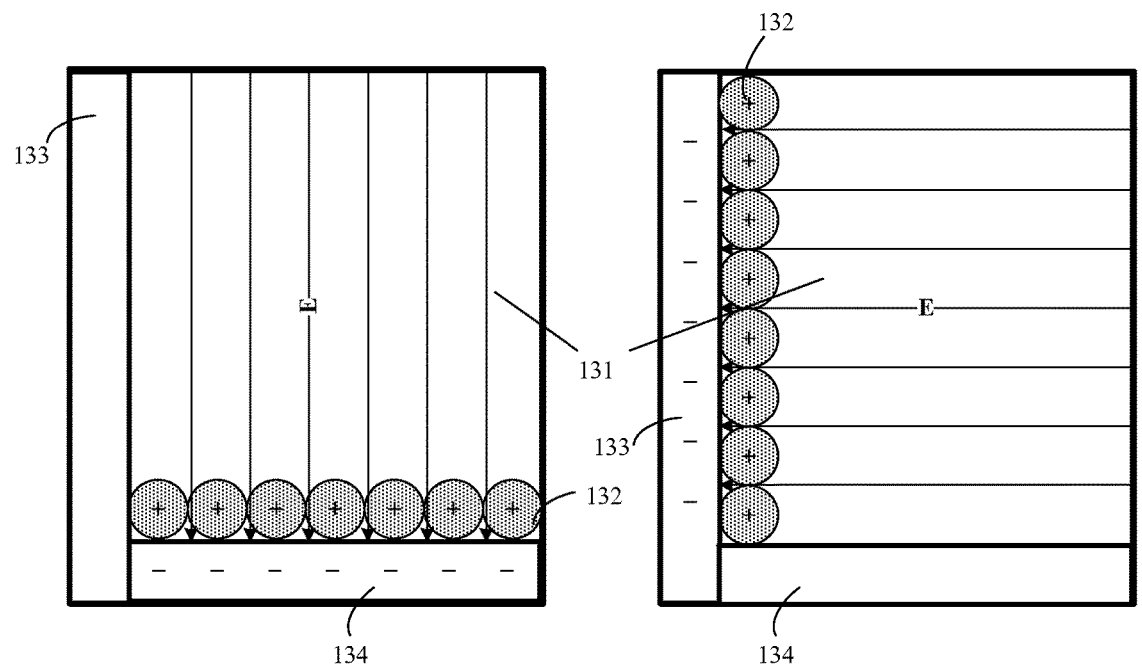

FIG. 8 shows the situation similar to FIG. 7, with the only difference that the second electrode structure 134 is arranged at the bottom wall of the accommodation chamber. After the negative voltage is applied to the second electrode structure 134, the electronic ink 132 moves to the bottom wall of the accommodation chamber, so as to form the blocking layer for blocking the light beam from the light-entering surface.

Case 3) where the electronic ink as a whole is non-transparent, and the first electrode structure 133 and the second electrode structure 134 are each of a double-electrode structure.

Figure 9:
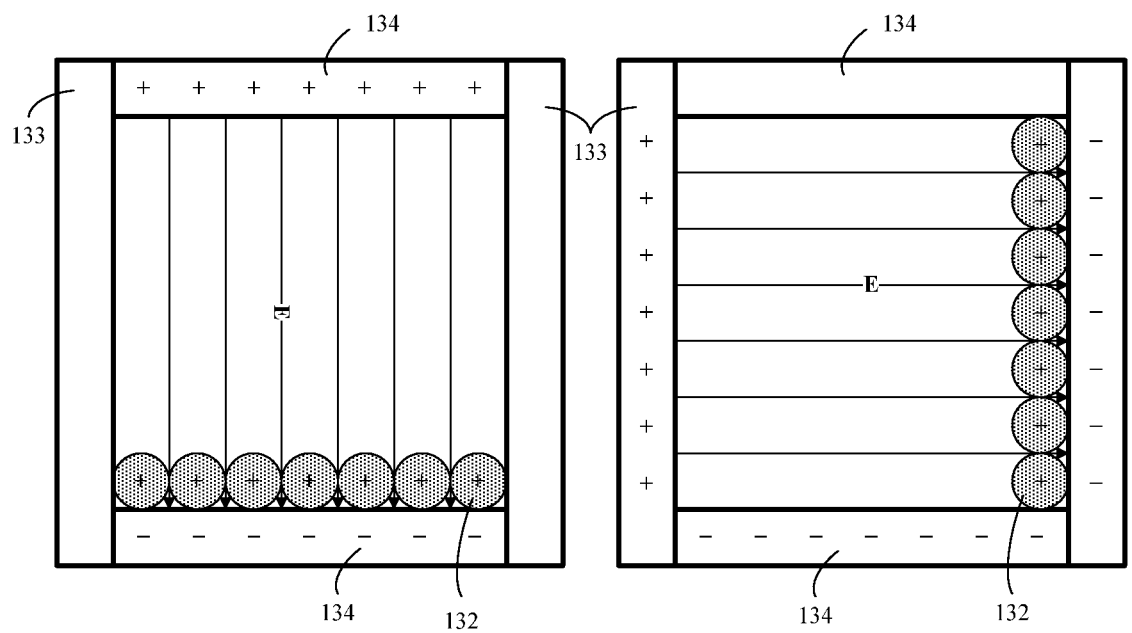

In FIG. 9, the electronic ink 132 is non-transparent and electropositive as a whole. At this time, the first electrode structure 133 and the second electrode structure 134 in the grating unit are each of a double-electrode structure and each includes two sub-electrodes arranged opposite to each other. The second electrode structure 134 includes the sub-electrodes arranged at the bottom wall and the top wall of the accommodation chamber, respectively, and the first electrode structure 133 includes the sub-electrodes arranged at the opposite side walls of the accommodation chamber. When it is required to form the blocking layer in the accommodation chamber 131, the electronic ink 132 moves to the bottom wall of the accommodation chamber under the effect of the electric field E after a positive voltage is applied to the second electrode structure 134 at the top wall of the accommodation chamber, and a negative voltage is applied to the second electrode structure 131 at the bottom wall of the accommodation chamber, so as to form the blocking layer for blocking the light beam from the light-entering surface. When it is required to form the light-transmitting channel in the accommodation chamber, as shown in FIG. 9, the positive voltage may be applied to the first electrode structure 133 on the left and the negative voltage may be applied to the first electrode structure 133 on the right. At this time, the electronic ink 132 moves to the side wall adjacent to the first electrode structure 133 on the right, so as to allow the light beam from the light-entering surface to pass therethrough.

Figure 10:
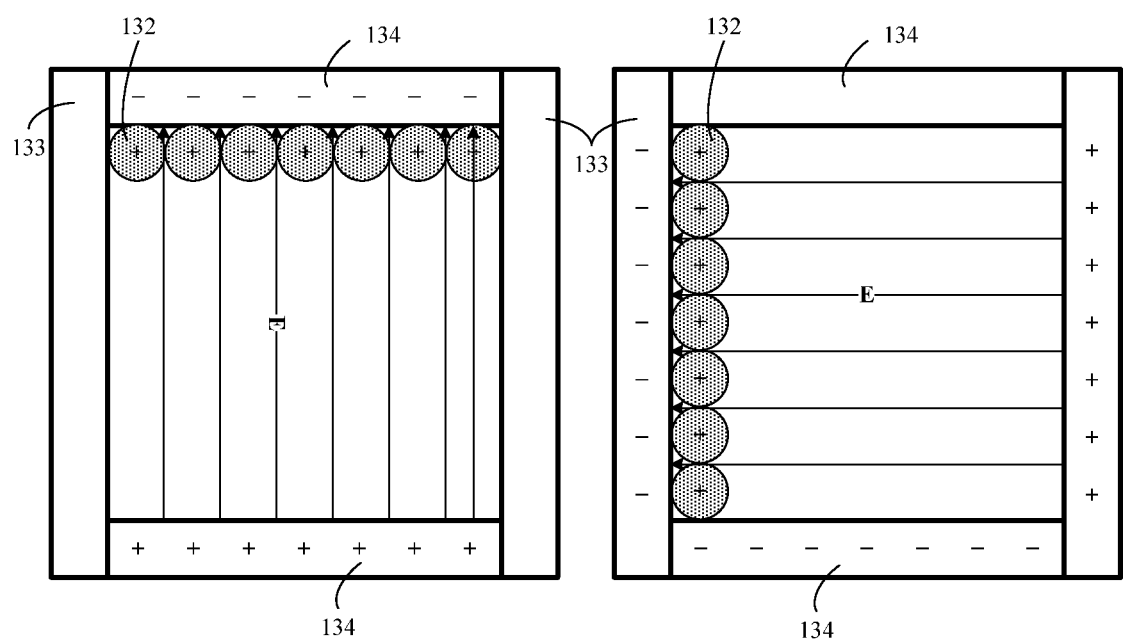

FIG. 10 shows the situation similar to FIG. 9, with the only difference that the voltages applied to the electrode structures 133 and 134 are of opposite polarities, which results in a different movement direction of the electronic ink 132.

Case 4) where the electronic ink 132 is partially reflective and partially non-transparent, and the first electrode structure 133 and the second electrode structure 134 are each of a single-electrode structure.

Figure 11:
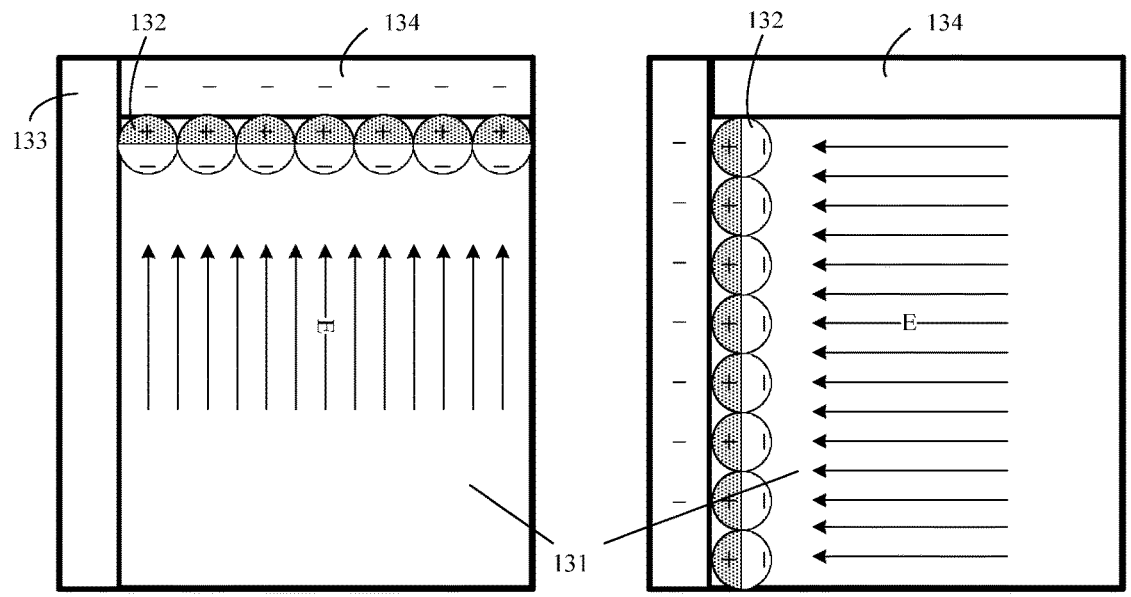

In FIG. 11, the light-entering surface is located at a side adjacent to the bottom wall of the accommodation chamber, and the light-exiting surface is located at a side adjacent to the top wall of the accommodation chamber. One hemispherical body of the electronic ink 132 is reflective and electronegative while the other hemispherical body is non-transparent and electropositive, and the electronic ink 132 as a whole is electropositive. To be specific, the electronic ink 132 may be of a half-black and half-white structure. The black hemispherical body is non-transparent and the white hemispherical body is reflective. At this time, the first electrode structure 133 and the second electrode structure 134 of the grating unit are each of a single-electrode structure, and the second electrode structure 134 is arranged at the top wall of the accommodation chamber. When it is required to form the blocking layer in the accommodation chamber 131, the electronic inks 132 moves to the top wall of the accommodation chamber under the effect of the electric field E after a negative voltage is applied to the second electrode structure 134 at the top wall of the accommodation chamber (i.e., an electric signal having an electric polarity opposite to the non-transparent hemispherical body is applied to the electrode at the light-exiting surface), so as to form the blocking layer for blocking the light beam from the light-entering surface. At this time, the non-transparent hemispherical body faces the light-exiting surface and the reflective hemispherical body faces the light-entering surface, so as to reflect the light beam from the light-entering surface back, thereby to improve the light utilization rate of the backlight source at the light-entering surface. When it is required to form the light-transmitting channel in the accommodation chamber 131, the negative voltage may be applied to the first electrode structure 133. At this time, the electronic ink 132 moves to the side wall adjacent to the first electrode structure 133, so as to allow the light beam from the light-entering surface to pass therethrough.

Figure 12:
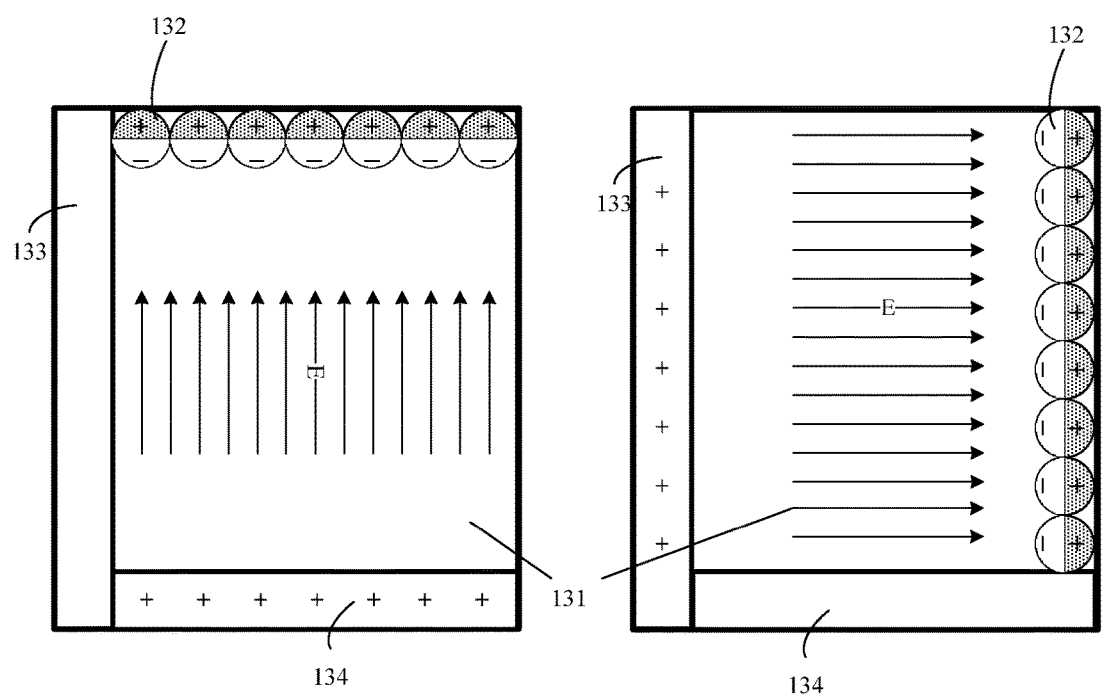

FIG. 12 shows the situation similar to FIG. 11, with the only difference that the second electrode structure 134 is of a single-electrode structure arranged at the bottom wall of the accommodation chamber. After the positive voltage is applied to the second electrode structure 134 (i.e., an electric signal having an electric polarity opposite to the reflective hemispherical body is applied to the electrode at the light-entering surface), the electronic ink 132 moves to the top wall of the accommodation chamber, so as to form the blocking layer for blocking the light beam from the light-entering surface. At this time, the non-transparent hemispherical body faces the light-exiting surface while the reflective hemispherical body faces the light-entering surface, so as to reflect the light from the light-entering surface back, thereby to improve the light utilization rate of the backlight source at the light-entering surface. The positive voltage is applied to the first electrode structure 133, and at this time, the electronic ink 132 moves to the opposite side wall, so as to allow the light beam from the light-entering surface to pass therethrough.

Case 5) where the electronic ink 132 is partially transparent and partially non-transparent, and the first electrode structure 133 and the second electrode structure 134 are each of a double-electrode structure.

Figure 13:
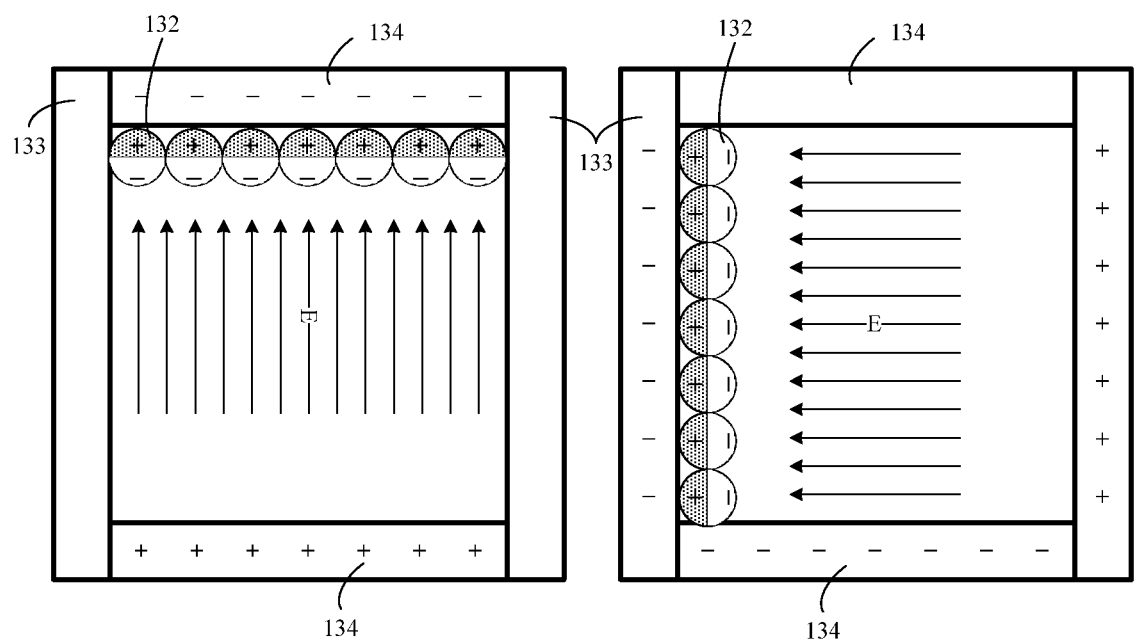

In FIG. 13, an electric signal having an electric polarity opposite to the reflective hemispherical body is applied to the electrode at the light-entering surface. One hemispherical body of the electronic ink 132 is reflective and electronegative, and the other hemispherical body is non-transparent and electropositive. The electronic ink 132 as a whole is electropositive. At this time, the first electrode structure 133 and the second electrode structure 134 of the grating unit are each of a double-electrode structure and each include two sub-electrodes arranged opposite to each other. The second electrode structure 134 includes the sub-electrodes arranged at the bottom wall and the top wall of the accommodation chamber, and the first electrode structure 133 includes the sub-electrodes arranged at the opposite side walls of the accommodation chamber. When it is required to form the blocking layer in the accommodation chamber, the electronic ink 132 moves to the top wall of the accommodation chamber under the effect of the electric field E after a negative voltage is applied to the second electrode structure 134 at the top wall of the accommodation chamber and a positive voltage is applied to the second electrode structure 134 at the bottom wall of the accommodation chamber (i.e., an electric signal having an electric polarity opposite to the non-transparent hemispherical body is applied to the electrode at the light-exiting surface, and an electric signal having an electric polarity opposite to the reflective hemispherical body is applied to the electrode at the light-entering surface), so as to form the blocking layer for blocking the light beam from the light-entering surface. When it is required to form the light-transmitting channel in the accommodation chamber, as shown in FIG. 13, the negative voltage may be applied to the first electrode structure 133 on the left, and the positive voltage may be applied to the first electrode structure 133 on the right. At this time, the electronic ink 132 moves to the side wall adjacent to the first electrode structure 133 on the left, so as to allow the light beam from the light-entering surface to pass therethrough.

In FIGS. 11-13, the electric polarity of the electronic ink 132 as a whole is identical to that of the non-transparent hemispherical body. It should be appreciated that, in the embodiments of the present disclosure, the electric polarity of the electronic ink 132 as a whole may also be identical to that of the reflective hemispherical body, and in this case, the same electric signals as mentioned above may be applied so as to form the blocking layer and enable the reflective hemispherical body to face the light-entering surface. Because the electric polarity of the electronic ink as a whole is opposite to that mentioned above, the movement directions of the electronic ink 132 are different from those mentioned above. For example, on the left as shown in FIG. 11, the electronic ink 132 moves to the top wall of the accommodation chamber, but in the case that the electric polarity of the electronic ink 132 as a whole is identical to that of the reflective hemispherical body, the electronic ink 132 moves to the bottom wall of the accommodation chamber.

The above embodiments are merely used to show parts of the electrode structures and electric field/voltage application modes applicable to the present disclosure. It should be appreciated that, in light of the above structures, the first electrode structure may be of a single-electrode structure while the second electrode structure may be of a double-electrode structure, or the second electrode structure may be of a single-electrode structure while the first electrode structure may be of a double-electrode structure. Furthermore, different electrode structures may be adopted in different grating units.

The electronic ink in the embodiments of the present disclosure will be described hereinafter briefly. The electronic ink may be made of a polymer. Alternatively, the electronic ink may be a charged electronic ink sphere and of a half-black and half-white structure, i.e., it includes a black hemispherical body which mainly functions as to absorb/block the light beam and a white hemispherical body which mainly functions as to reflect the light beam. The black hemispherical body is positively charged while the white hemispherical body is negatively charged, and the electronic ink as a whole is electropositive. The charged sphere may be manufactured by an existing microchannel-based manufacturing method.

For the microchannel-based manufacturing method, due to an O/W (oil in water) or W/O (water in oil) relationship between a colored continuous phase and a spherically particulated phase, two-color continuous phases are sequentially ejected from a first microchannel which transfers the colored continuous phases, into the spherically particulated phase of a flow medium flowing in a second microchannel, so as to prepare a bipolar sphere including a spherical polymer particle in two color phases and having both positive and negative charges.

Specifically, in the oily or aqueous flow medium containing a polymerizable region component, the polymerizable resin component, formed in the medium in the form of positively and negatively charged polymerizable monomers and containing insoluble coloring pigments, is separated into the two-color continuous phases, and then transferred to the first microchannel.

Next, the colored continuous phase is ejected continuously or intermittently to the aqueous or oily spherically particulated phase flowing in the second microchannel.

Then, a substance ejected to the spherically particulated phase is spherically particulated in the microchannel during its ejection/dispersion/transfer and spherized in the spherically particulated phase. The polymerizable resin component in the spherical particle is polymerized and cured under UV light and/or by heating, so as to appropriately modulate the sphere.

The colored continuous phase is a two-color continuous phase. For example, a black/white colorant may be used to form this color phase, as long as the flowable dispersion medium containing the polymerizable resin component is insoluble or can be dispersed evenly. In other words, the colorant is not particularly defined herein.

As the colorant, a black portion mainly includes carbon black, and a white portion is mainly achieved by chemical silvering so as to achieve a better reflective effect.

In the embodiments of the present disclosure, the colorant is added at an amount of 0.1 wt % to 80 wt %, alternatively 2 wt % to 10%, relative to the fully-polymerizable resin component which serves as the component for polymerizing and curing in the colored continuous phase.

Depending on the types of functional groups or substituents of the polymerizable monomers used in a torsional ball, the polymerizable resin component (or the polymerizable monomers) contained in the sphere may include negatively-charged (−) and positively-charged (+) monomers. Hence, when at least two kinds of monomers are used as the polymerizable resin component in the embodiments of the present disclosure, it is well known that the polymerizable resin component tends to negatively or positively charged. Alternatively, the monomers which are negatively or positively charged may be used.

Hence, due to the O/W (oil in water) or W/O (water in oil) relationship between the colored continuous phase and the spherically particulated phase, the two-color continuous phases are sequentially ejected from the first microchannel, which transfers the colored continuous phase, into the spherically particulated phase of the flow medium flowing in the second microchannel, so as to prepare the bipolar sphere including the spherical polymer particle in two color phases and having both positive and negative charges. In addition, the amounts of the charges on the black portion and the white portion are different from each other, so the bipolar sphere as a whole is electropositive or electronegative, rather than electroneutral.

For more details about the microchannel-based manufacturing method, it may refer to the Chinese patent application No. 200380104921.2, which will not be repeated herein.

The above are merely the preferred embodiments of the present disclosure. It should be appreciated that, a person skilled in the art may make further modifications and improvements without departing from the spirit of the present disclosure, and these modifications and improvements shall also fall within the scope of the present disclosure.

What is claimed is:

1. A grating structure comprising a light-entering surface, a light-exiting surface, and a plurality of grating units arranged continuously between the light-entering surface and the light-exiting surface; wherein each of the grating units comprises:
    an accommodation chamber;
    a non-transparent electronic ink received in the accommodation chamber and having a predetermined electric polarity; and
    a controlling module arranged at a periphery of the accommodation chamber and configured to control a region of the electronic ink in the accommodation chamber;
    wherein when an electric signal is applied by the controlling module, the electronic ink moves to a corresponding region in the accommodation chamber; and after the electric signal is cancelled by the controlling module, the electronic ink is maintained at the current region.

2. The grating structure according to claim 1, wherein the electronic ink is of a spherical structure which exhibits as a whole a first electric polarity or a second electric polarity; and the electronic ink comprises a first hemispherical body which is non-transparent and exhibits the first electric polarity, and a second hemispherical body which is reflective and exhibits the second electric polarity opposite to the first electric polarity.

3. The grating structure according to claim 2, wherein when a first electric signal is applied by the controlling module and the electronic ink moves to a first region in the accommodation chamber, a light-transmitting channel is formed in the accommodation chamber from the light-entering surface to the light-exiting surface; and
    when a second electric signal is applied by the controlling module and the electronic ink moves to a second region in the accommodation chamber, the electronic ink forms a blocking layer for blocking a light beam from the light-entering surface from passing through the light-exiting surface.

4. The grating structure according to claim 3, wherein when the electronic ink forms the blocking layer, the first hemispherical body of the electronic ink faces the light-exiting surface, and the second hemispherical body of the electronic ink faces the light-entering surface.

5. The grating structure according to claim 4, wherein the controlling module comprises:
    at least one first electrode structure located at a side wall of the accommodation chamber;
    a second electrode structure located at a top wall or a bottom wall of the accommodation chamber; and
    an energization controlling unit configured to apply an electric signal to the first electrode structure or the second electrode structure, to generate an electric field for the electronic ink so as to move the electronic ink to the corresponding region in the accommodation chamber.

6. The grating structure according to claim 5, wherein
    when the first electric signal is applied by the energization controlling unit to the first electrode structure and the electronic ink moves to the first region in the accommodation chamber, the light-transmitting channel is formed in the accommodation chamber from the light-entering surface to the light-exiting surface; and
    when the second electric signal is applied by the energization controlling unit to the second electrode structure and the electronic ink moves to the second region in the accommodation chamber, the electronic ink forms the blocking layer for blocking the light beam from the light-entering surface from passing through the light-exiting surface.

7. The grating structure according to claim 6, wherein the second electric signal comprises an electric signal applied to the second electrode structure at the light-entering surface and exhibiting the first electric polarity, and/or an electric signal applied to the second electrode structure at the light-exiting surface and exhibiting the second electric polarity.

8. The grating structure according to claim 5, wherein
    when a 2D display mode is switched to a 3D display mode, in a first grating unit and a second grating unit adjacent to each other, the first electric signal is applied by the energization controlling unit of the first grating unit to the first electrode structure of the first grating unit, and the second electric signal is applied by the energization controlling unit of the second grating unit to the second electrode structure of the second grating unit; and
    when the 3D display mode is switched to the 2D display mode, the first electric signal is applied by the energization controlling unit of each grating unit to the first electrode structure of the grating unit.

9. The grating structure according to claim 5, wherein the second electrode structure is only arranged at the top or bottom wall of the accommodation chamber, and the second electric signal is of an electric polarity opposite to the electronic ink.

10. The grating structure according to claim 5, wherein the second electrode structure comprises two electrodes arranged at the top wall and the bottom wall of the accommodation chamber, respectively; the second electric signal includes two electric sub-signals applied to the two electrodes and having opposite electric polarities.

11. A display device comprising a display panel, and a grating structure arranged on the display panel;
    wherein the grating structure comprises a light-entering surface, a light-exiting surface, and a plurality of grating units arranged continuously between the light-entering surface and the light-exiting surface; wherein each of the grating units comprises:
    an accommodation chamber;
    a non-transparent electronic ink received in the accommodation chamber and having a predetermined electric polarity; and a controlling module arranged at a periphery of the accommodation chamber and configured to control a region of the electronic ink in the accommodation chamber;

wherein when an electric signal is applied by the controlling module, the electronic ink moves to a corresponding region in the accommodation chamber; and after the electric signal is cancelled by the controlling module, the electronic ink is maintained at the current region.

12. The display panel according to claim 11, further comprising a backlight module, wherein the grating structure is arranged between the display panel and the backlight module.

13. A display mode switching method for the display device according to claim 11, comprising:

when switching from a first display mode to a second display mode,
in a first grating unit and a second grating unit adjacent to each other in a grating structure of the display device, applying a first electric signal to a first electrode structure of the first grating unit and applying a second electric signal to a second electrode structure of the second grating unit;
cancelling the first electric signal when an electronic ink in the first grating unit moves to a first region of the first grating unit to form a light-transmitting channel from a light-entering surface to a light-exiting surface of the grating structure; and
cancelling the second electric signal when the electronic ink in the second grating unit moves to a second region of the second grating unit to form a blocking layer for blocking a light beam from the light-entering surface from passing through the light-exiting surface; and when switching from the second display mode to the first display mode,
applying the first electric signal to a first electrode structure of the second grating unit;
cancelling the first electric signal applied to the first electrode structure of the second grating unit when the electronic ink in the second grating unit moves to a first region of the second grating unit to form a light-transmitting channel in the second grating unit from the light-entering surface to the light-exiting surface.

14. The display mode switching method according to claim 13, wherein when switching from the second display mode to the first display mode, the display mode switching method further comprises:
applying the first electric signal to the first electrode structure of the first grating unit, and
cancelling the first electric signal applied to the first electrode structure of the first grating unit when the electronic ink in the first grating unit moves to the first region of the first grating unit to form the light-transmitting channel from the light-entering surface to the light-exiting surface of the grating structure.

15. The display mode switching mode according to claim 13, wherein the first display mode is a 2D display mode, and the second display mode is a 3D display mode.

* * * * *